United States Patent
Lee et al.

(10) Patent No.: US 7,822,406 B2
(45) Date of Patent: Oct. 26, 2010

(54) SIMPLIFIED DUAL MODE WIRELESS DEVICE AUTHENTICATION APPARATUS AND METHOD

(75) Inventors: Shze Chew Lee, Irvine, CA (US); Andrew M. Gutman, Foothill Ranch, CA (US); Edward Dean Willis, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 497 days.

(21) Appl. No.: 11/408,764

(22) Filed: Apr. 21, 2006

(65) Prior Publication Data

US 2007/0249323 A1     Oct. 25, 2007

(51) Int. Cl.
*H04M 1/66* (2006.01)
*H04W 4/00* (2009.01)
*G06F 7/04* (2006.01)
*H04K 1/00* (2006.01)

(52) U.S. Cl. .................. 455/411; 455/410; 370/338; 726/4; 726/9; 726/21; 726/28; 380/247

(58) Field of Classification Search ............... 726/1–21, 726/28, 9; 455/410–411, 552.1; 370/338, 370/310, 328; 380/247
See application file for complete search history.

(56) References Cited

U.S. PATENT DOCUMENTS

| | | | |
|---|---|---|---|
| 2001/0048744 A1* | 12/2001 | Kimura | 380/247 |
| 2005/0232209 A1* | 10/2005 | Buckley et al. | 370/338 |
| 2006/0251256 A1* | 11/2006 | Asokan et al. | 380/270 |
| 2009/0164643 A1* | 6/2009 | Thompson et al. | 709/227 |

* cited by examiner

*Primary Examiner*—George Eng
*Assistant Examiner*—Marcos L Torres
(74) *Attorney, Agent, or Firm*—Haynes and Boone, LLP.

(57) ABSTRACT

Provisioned wireless service (PWS) authentication apparatus and method simplifies determination of PWS authentication state by dual mode access point (DMAP) receiving an identifying credential from supplicant dual mode mobile station (DMMS) within predefined authentication period and comparing with authentication credential. DMMS is provisioned PWS upon authentication. DMAP having multiple BSSID remotely configurable to differentiate between provisioned services (e.g., voice, VoIP) and standard wireline/fixed wireless services. DMAP and DMMS are each identifiable by respective unique provisioned service BSSID. Identifying credential can be pass code supplied to DMMS user by DMAP operator to facilitate authenticated association and to deter wireless channel interlopers.

22 Claims, 3 Drawing Sheets

SIMPLIFIED DUAL MODE WIRELESS DEVICE AUTHENTICATION APPARATUS AND METHOD

TECHNICAL FIELD

The present invention relates to security apparatus and methods and, in particular, to apparatus and methods for authentication of a dual-mode wireless device.

BACKGROUND

With the confluence of electronic communications, data, and computing services, (collectively, services) there arises a need to bridge the disparate network infrastructures supporting these services and to address resulting new opportunities and challenges. A wireline network (WLN) employs a structured transmission medium, including copper wire, fiber optic cable, and other defined waveguides. By comparison, a wireless network can be any network with a physical layer that permits constituent devices to communicate using an unstructured transmission medium, such as the atmosphere, or space. Wireless networks have developed within two formerly distinct spheres: wireless wide area networks (WWAN), which were cast in the formal likeness of wireline telephony networks; and wireless local area networks (WLAN), which are often informally structured, if at all, having coverage zones of at least three of magnitude less than a WWAN. Currently popular WWAN networks can provide mobile wireless services, as specified by the AMPS, D-AMPS, PCS, GSM, and UMTS wireless mobile service standards. A growing diversity of WLAN standards describe the physical-to-network architectures of fixed wireless services, with devices operable with WLAN frequently being capable of being operable with more than one type of fixed wireless service. Dual-mode devices were developed to meet the diverse needs of those using both WWAN and WLAN systems.

Dual-mode services are becoming attractive to mobile operators and their subscribers because of three trends: a growing population of mobile subscribers, the prevalence of home broadband connections, and the availability of low-cost, home wireless access points that support local wireless networking. To satisfy this evolving need, technology manufacturers are developing and introducing into the marketplace, dual-mode devices, that is, devices capable of communicating over mobile radio networks, such as mobile phone networks, and wireless local area networks, such as those found in the increasingly popular "hotspots," or access zones for wireless networking, frequently providing the myriad of services available over the Internet.

A dual mode device can offer advantages over a single mode device. First, although mobile wireless systems may provide mobile wireless services to the high-mobility receiving stations of subscribers within a broad geographic area, they bear the disadvantages of poor indoor reception and uneven signal availability, particularly in dense urban environments hilly terrain. Second, fixed wireless systems can deliver a vast range of broadband services to stationary or low-mobility receivers located indoors, within a broadcast zone (e.g., hot spots or hot zones), but are disadvantaged by sharply-limited signal range, security and billing concerns, and the uncertainties arising from proprietary ownership and non-uniform product availability. Thus, a dual-mode device can enable a mobile service subscriber to switch from mobile wireless services to fixed wireless services, for example, in an area of poor mobile wireless service coverage. In addition, with a dual-mode device, using dual-mode services, mobile wireless service subscribers may make voice calls when outdoors in the ordinary manner, using the facilities of the subscribed mobile wireless service at the standard tariff rate. While indoors or in a remote geographic location where a signal compatible with the subscribed mobile wireless network is unavailable, a dual-mode device may permit customers to make and receive voice calls using a fixed wireless network. To reflect the offloading of the subscriber's call bandwidth from the mobile wireless service provider's to a less-expensive fixed wireless network and the Internet, the mobile wireless provider may offer the mobile wireless subscriber lower tariff rates when using a fixed-wireless link. Also, a dual-mode device makes possible voice call handoff and transfer of communication links as a subscriber roams between mobile wireless and fixed wireless systems. Furthermore, dual-mode devices and services create an opportunity for subscribers or vendors who wish to assist a third party with obtaining provider-authorized allocations of mobile wireless voice or dual-mode services. Nevertheless, there is a substantial need to provide apparatus and methods rendering the desired degree of security to protect a mobile wireless provider infrastructure from Internet-based threats, as well as to safeguard provider network operator for their subscribers from interlopers and miscreants.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION

Figure 1:
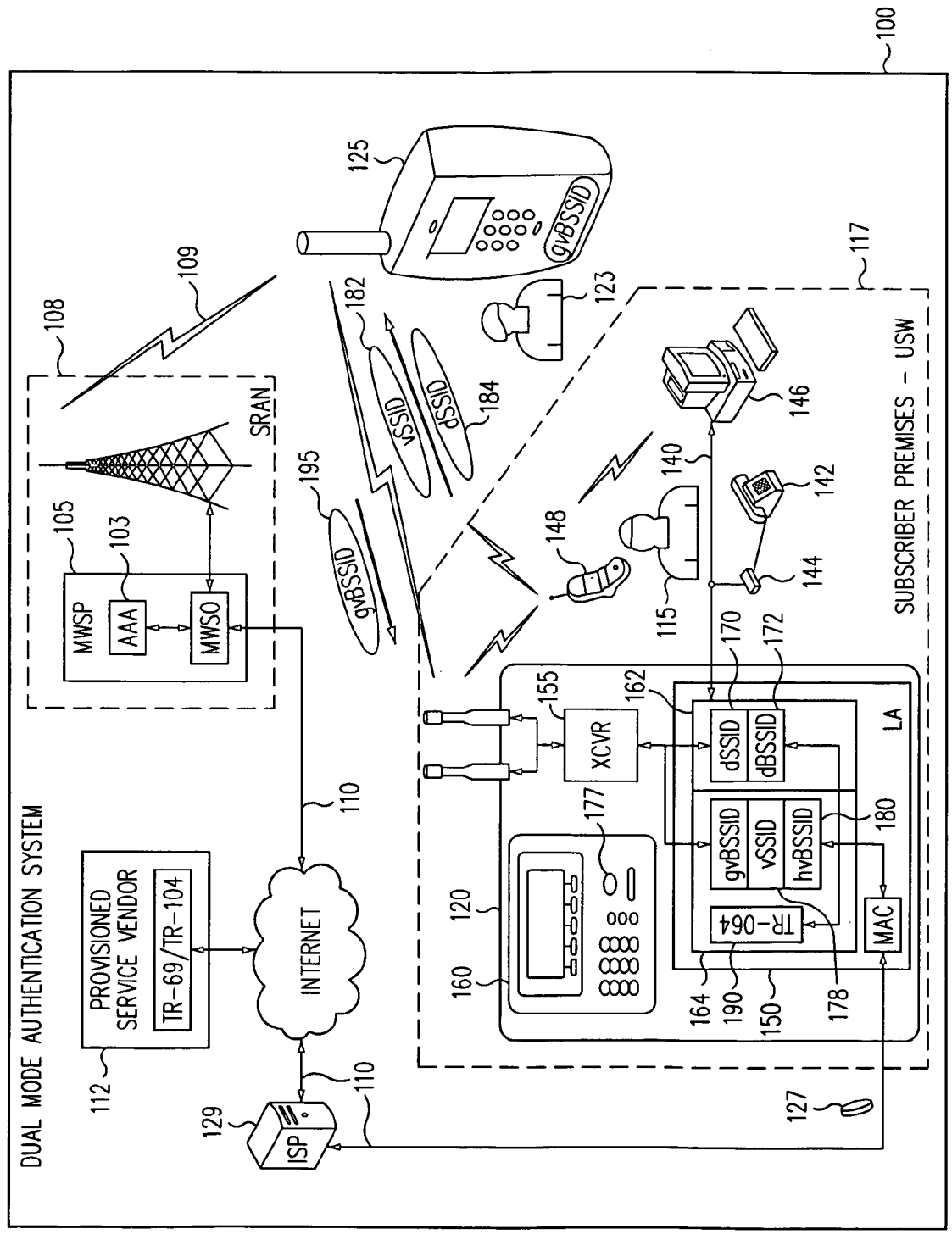
FIG. 1 is a graphical depiction of a dual-mode authentication system, as an embodiment of the invention herein.

The inventive embodiments of the invention described herein include apparatus and methods for provisioning provisioned wireless services (PWS) to an authorized device by a provisioned service provider (PSP) in which a supplicant device may become an authorized device after successful authentication. A PWS can be any wireless service including, without limitation voice service, short message service (SMS), multimedia message service (MMS), video broadcasts, instant messaging, news and financial information, games and interactive gaming, Web-based services, and premium data services, to name a few.

A PSP can be a mobile wireless service provider, which also may operate a WWAN, also known as a radio area network, or RAN. A mobile telephone network is an exemplary RAN. Typically, WWAN provide service signals over a broad geographic region, using high-powered (more than 10 W per channel) transmitters that are licensed to broadcast within defined frequency bands, which typically are allocated and regulated by a public authority. WWAN signals may be encoded or use sophisticated signaling techniques to provide privacy between communicating parties from potential eavesdroppers. Current WLAN transmit signals that are low-powered (under 0.1 W per channel), limited-range (under about 300 m), and generated within prescribed frequency bands (e.g., 2.4 GHz, 5 GHz, 11 GHz, and 60 GHz). In general, such fixed wireless networks may be designated "unlicensed spectrum" wireless networks (USW), because by international consent, no operating license is required for wireless systems designed to operate within these constraints. USW can include networks employing the wireless protocols defined by the IEEE Std. 802.11 family of standards (including IEEE WLAN Stds. 802.11a, 802.11b, 802.11g, 802.11n, and 802.11j); IEEE Std. 802.15 (including wireless personal area networks—WPAN); IEEE Std. 802.16 (including wireless metropolitan area networks—WMAN); and by the ETSI Broadband Radio Access Network and Radio LAN Standards (e.g., HiperLAN2, HiperMAN, and HiperRAN), as well as, the TTR Korea WiBRO mobile network standard.

In large part, a wireline network (WLN) can be based on one of the family of standards, IEEE Std. 802.3 CSMA/CD Access Method, including 10 Mbps "Ethernet" (Stds. 802.3a, 802.3i, and 802.3j), 100 Mbps "Fast Ethernet" (Std. 802.3u), 1000 Mbps Gigabit Ethernet [GbE] (Stds. 802.3z, 802.3ab), and 10,000 Mbps GbE (Std. 802.3ae) Because IEEE Stds. 802.3 specify the lowermost networking layers (e.g., OSI Layers 1-3), the inventive embodiments herein are foreseeably operable with access technologies having bandwidth greater than 10 Gigabit Ethernet WLN. Each of the foregoing standards and specifications are incorporated herein, in their entirety. Also as used herein, the term generic access network (GAN) refers to both USW and WLN, when convenient to distinguish both from RAN-based networks. Furthermore, a WLN may include the Internet, where a person having ordinary skill in the art would recognize that inclusion is appropriate.

As used herein, the like terms "provision" and "provisioned" in verb form, and "provisioning" in gerund form, refer to a process including one or more of, without limitation: creating for an authorized user a service account for a subscribed service, the appropriate access to that account, the rights associated with that account, and the resources for managing the accounts; configuring one or both of authorized user hardware and software to activate the subscribed service; creating or modifying a record in an authorized user database and associating it with the service(s) and service level for which the authorized user has subscribed; providing the authorized user with subscribed provisioned wireless service resources, in accordance with the subscription agreement; and issuing preselected allocation units of PWS to the authorized user, upon request. Performing AAA services in conjunction with PWS requests and usage can be a provisioning activity as well. In general, AAA services include authentication, authorization and accounting, whereby prior to service, a PWS requester is authenticated and authorized to use the service offered by a MWSP or PSV in response to the PWS request; and while the PWS is delivered, PWS usage is metered and usage data is collected and can be associated with billing and collection.

PWS offered over a subscribed RAN (SRAN) typically are within the context of well-established and highly regulated access control, security, integrity, cost recovery, billing, enforcement, and Quality of Service mechanisms. GAN may lack one, more, or all of these features, simplifying the quest of unscrupulous users to purloin, misuse, or compromise valuable wireless services. To address the disparities in the regulatory and business structures between SRAN and GAN, and to encourage providers to offer valuable data and services regardless of the transmission medium used, a number of entities have put forth standards, provisional recommendations, and proposals for interoperative infrastructure management and policy enforcement. Pragmatic implementations tend to control access to services at a point close to service use, namely the customer premises, by remote management of customer premises equipment (CPE) through which such data and services are requested.

It is desirable to implement embodiments of the present invention in cooperation with remotely managed customer premises equipment (CPE) in accordance with a managed access architecture, premises network, and management, control, and interoperability principles and standards, articulated by the following exemplary DSL Forum Technical Reports, as amended: TR-044, Auto-Configuration for Basic Internet (IP-based) Services, December 2001; TR-046 Auto-Configuration Architecture & Framework, February 2002; TR-064, LAN-Side DSL CPE Configuration, May 2004; TR-069, CPE WAN Management Protocol, May 2004; TR-092, Broadband Remote Access Server (BRAS) Requirements Document, August 2004; TR-094, Multi-Service Delivery Framework for Home Networks, August 2004; TR-104, DSLHome™ Provisioning Parameters for VoIP CPE, September 2005; TR-110, DSLHome™ Reference Models for VoIP Configurations in the DSL Home, September 2005; and TR-111, Applying TR-069 to Remote Management of Home Networking Devices, December 2005. It is to be understood that other CPE-management models also may apply, including without limitation, those described in European Telecommunications Standards Institute document: Telecommunications and Internet Converged Services and Protocols for Advanced Networking (TISPAN); NGN management; OSS Architecture Release 1 (ETSI TS 188 001V0.2.9 (2005-07)); and by IEEE Std. 802.21. The foregoing standards of the IEEE, ETSI, Korea TTR, and DSL Forum are incorporated herein by reference, in their entirety.

In general, the three fundamental security processes include access control, authentication, and audit. Of these constituent security processes, access control is a policy-based process that determines whether a supplicant is permitted to access a requested resource or service (i.e., "Are you permitted to access this resource?"). Authentication is a credential-based process by which a supplicant verifies its identity to the authenticator (i.e., "Are you who you say you are?"). Authentication also may include identification, and non-repudiation functions. Audit is an administrative process by which the appropriateness of policy-defined access to resources is monitored, and by which security enforcement mechanisms may be invoked upon identification of a policy violation. Audit also may include analysis of integrity (e.g., of link, data, or identity), intrusion detection, and containment. Finally, authorization can be an executive process that comprehends at least two of the constituent security processes, usually incorporating requirements of security policy, regulatory framework, and the like. For example, in an authorization process where a security policy implements authentication, a supplicant is required to prove its identity before access credentials are issued to the supplicant. In practice, security processes may vary in scope vertically and horizontally, and be almost as diverse in implementation as the applications needing security. A security process of vertical scope may operate at increasingly complex and abstract layers, e.g., authentication may be described within the context of a device level, a user level, an organization level, and an enterprise level. Similarly, horizontal security processes can include compartments that span communication occurring at one or more points along a communication path. For example, authentication may be compartmentalized with respect to a simple device-to-device exchange, to remote network links, or to a complete end-to-end secure communication exchange. End-to-end security also may result from cooperation of a sequence of cooperating authentication compartments which, in the whole, span the communication path. Frequently, contiguous subprocesses interact or overlap, although there may be no requirement for a given security process to be continuously operable over any portion of the communication path or over more than one physical or logical layer. Cryptographic processes may also be a constituent of authorization, and may include key creation, management, and distribution and encrypted communications. Thus, even if a supplicant is properly authenticated to the desired horizontal and vertical layers of security, the supplicant may not be able to participate in particular communications because the authorization process denied a requisite encryption key to the supplicant. The aforementioned security principles, as used herein are provided in National Institute of Standards and Technology (NIST) Special Publication 800-12, An Introduction to Computer Security: The NIST Handbook; and NIST Special Publication 800-48, Wireless Network Security: 802.11, Bluetooth and Handheld Devices, which documents are hereby incorporated herein in their entirety. Desirably, security processes exemplified in the present embodiments can implement or facilitate AAA processes of a provisioned service provider, and may further be enhanced by remote configuring of a local authenticator in an USW access point, in accordance with a foregoing remote configuration as a CPE.

Within the above context, FIG. 1 illustrates an embodiment of dual-mode authentication system 100 according to the present invention that includes a USW access point. Mobile wireless service provider (MWSP) 105, coupled to a RAN-based subscribed radio area network (SRAN) 108 and a wireline network (WLN) 110, can provision PWS, when requested, directly, or through an intermediary, which may be a Provisioned Services Vendor (PSV) 112. PSV 112, also coupled to the WLN 110, can provision PWS to an authorized device, and may provision PWS in cooperation with another provisioned service provider (PSP), which may include MWSP 105. The authorized device may be dual-mode access point (DMAP) 120 of unlicensed spectrum wireless network (USW) 117 operated by MWSP provisioned service subscriber (PSS) 115. DMAP 120 can be a USW access point adapted to couple USW 117 to wireline network (WLN) 110, and to be remotely configurable by a PSP. An authorized user also can be PSS Guest 123. Guest 123 can communicate using dual mode mobile station (DMMS) 125. DMMS 125 can be configurable to communicate, in a first mode, with DMAP 120 over USW 117 and, in a second mode, with MWSP 105 over SRAN 108. DMSS 125 need not be configured to communicate in both modes simultaneously. DMMS 125 may be a supplicant wireless device, e.g., as it seeks to associate with DMAP 120, or may be an associated device, e.g., after association is completed. It is desirable to adapt DMAP 110 to be configurable as a remotely managed CPE using a remote CPE management technique, such as the aforementioned techniques for remotely managed CPE. Using DMMS 125 in communication with the DMAP 120, Guest 123 can request, and may be authorized to receive, a predefined PWS allocation unit, hereafter, a PWS token 127, requested from one of MWSP 105, PSV 112, and PSS 115. DMAP 120 can be configured to employ a first predefined authentication technique, in which DMAP 120 authenticates the identity of DMMS 125 and, upon DMMS 125 authentication by the predefined authentication technique, to provision PWS token 127 to DMMS 125. Alternatively, DMAP 120 can be configured to facilitate PWS provisioning by employing a second predefined authentication technique, in which DMAP 125 passes authentication credentials obtained from DMMS 125 through to a provisioned service provider (PSP), including one of MWSP 105 and PSV 112. Upon authentication of DMMS 125, the PWS provisioner can transmit PWS token 127 to DMAP 120, which can pass PWS token 127 to DMMS 125.

In general, DMAP 120 can implement link-layer and device-level authentication, as described by IEEE Std. 802.11 (1999) and by IEEE Std. 802.1x, including WEP, WPA, WPA2, MAC filtering, and the like. See, for example, the white paper entitled: "A Comprehensive Review of 802.11 Wireless LAN Security and the Cisco Wireless Security Suite" (October 2003) at URL: http://www.cisco.com/warp/public/cc/pd/witc/aol200ap/prodlit/wswpf_wp.pdf (verified Mar. 21, 2006), hereinafter referred to as "A Comprehensive Review." However, provisioned service providers may demand user-level authentication of supplicant guest 123 attempting to access provisioned services, so that the identity of guest 123 is verified. To this end, it may be convenient to implement selected embodiments of the present invention to provide user-level authentication. User-level authentication implementations are well-known in the converged arts art of computer and network security, as may be typified in "A Comprehensive Review", as well as in the Broadcom Corporation White Paper entitled "Securing Home Wi-Fi® Networks: A Simple Solution Can Save Your Identity," Wireless-WP200-x, (May 18, 2005) at URL http://www.54g.org/pdf/Wireless-WP200-RDS.pdf (verified Mar. 21, 2006); and in the Cisco Systems, Inc. Application Note, entitled: "802.1x and EAP-Based Authentication Across Congested WAN Links," March 2002, at URL http://www.cisco.com/warp/public/cc/pd/witc/ao350ap/prodlit/authp_an.pdf (verified Mar. 16, 2006). The foregoing references are hereby incorporated by reference herein in their entirety, but are exemplary, are not to be considered inclusive or limiting examples.

Also, effective security implementations in a wireless/USW environment can include successive layers of constituent security processes, sequences of constituent security processes, and combinations thereof. In a fixed wireless environment/USW, one device-level authentication implementation, e.g., OSA, effects connectivity between devices in the physical link layer, but is susceptible to breach when viewed from the perspective of a logical, end-to-end implementation. Other device-level authentication methods, such as MAC filtering, can provide an appropriately greater degree of security than OSA, but are not intended to verify the identity of the entity using the device. In this instance, entity authentication techniques may be used to verify the identity of the entity by comparing identification information provided by the entity to the content of a known and trusted information repository. User-level authentication is a form of entity authentication capable of being adapted to the fixed wireless/USW environment, in which the user of a USW supplicant device can provide a credential verifiably asserting the user's identity.

Embodiments of the present invention can be adapted to implement horizontal and vertical constituent and executive security processes which cooperate to identify one of the authentication state, indicating whether guest 123 has proven its identity through DMMS 125, and the eligibility state, indicating whether DMMS 125 is a supplicant device eligible to receive provisioned wireless services. In selected exemplary embodiments, it is desirable to configure an authenticator, such as local authenticator 150 to implement link-layer, and device-to-device, authentication and identification. Relative to link layer and device-to-device authentication, local authenticator can determine whether supplicant device DMMS 125 is as mobile device, which may be allowed to associate with DMAP 110, and which potentially may be eligible to request provisioned services. The inventive embodiments herein desirably provide remote CPE configuration of local authenticator 150 by provisioned service providers MWSP 105 and PSV 112, by which local authenticator 150 can be configured to implement user-level authentication. In exemplary embodiments, guest 123 may be authenticated at a user level to receive provisioned wireless services using DMMS 125. Local authenticator 150 can challenge a supplicant, such as DMMS 125, to prove its identity, with the result of the challenge being represented by an authentication state. DMMS 125 can communicate to DMAP 110 a pass code entered by guest 123. Local authenticator 150 can evaluate the pass code to determine an authentication state with respect to guest 123. If the authentication state of DMMS 125 indicates that the identity of guest 123 using DMMS 125 is authenticated, then local authenticator 150 may use the identification information to further qualify supplicant device DMMS 125 for eligibility to received selected provisioned services. The term eligibility can comprehend product capabilities as well as service or QoS features that may be available to guest 123 under term of a provisioned service subscription agreement, which agreement may be made between PSS 115 and PSV 112 or MWSP 105.

Embodiments of the present invention can effect one or both of authentication and provisioning, at least in part, by securely transmitted authentication, authorization, and provisioning information from upstream provisioned service providers including, without limitation, MWSP 105 and PSV 112. In contrast, authentication and other security mechanisms and methods that operate autonomously within the local communication range of an access point, typically have at least one non-secure broadcast, through which an interloper or miscreant may be able to gain access to the network broadcasting its availability. Furthermore, in some local authentication schemes, an access point is adapted to allow the device-level authentication, linking and association of other supplicant mobile stations that may present acceptable device-level authentication or identifying credentials to the soliciting access point, within an activation or accession period. These schemes may permit interloping or miscreant mobile stations may be among the plural supplicant devices. Advantageously, embodiments of the present invention can limit accession by supplicant devices by terminating access point activation upon successful authentication of a supplicant device, even if the authentication period of predetermined length has not elapsed.

Thus, PWS authentication according to embodiments of the present invention, can provide a secure authentication process by which the identity of Guest 123 using DMMS 125 is verified. Although embodiments of the present invention are conveniently illustrated in the context of access points, such as DMAP 120, which are capable of providing one or both of multiple SSID and BSSID, it must be understood that PWS authentication can be implemented with DMAP 120 providing a single SSID, a single BSSID, or both. In such an instance, differentiation between provisioned and non-provisioned services (e.g., VoIP and ISP data, respectively) can be implemented in a component or function cooperating with DMAP 120, such as a router (not shown) capable of managing data packets tagged or identified by content or requisite QoS. DMAP 120 may operate with PWS authenticated mobiles stations such as DMMS 125 and may reject traffic from non-PWS-authenticated mobile stations. In such a case, DMAP 120 may accept all traffic from the PWS-authenticated client, with the router (not shown) coupled thereto, managing service differentiation. Router service differentiation, for example, may be accomplished by using internal queueing policies, by priority handling techniques generally guided by IEEE Stds. 802.1p or 802.1q, or by combinations thereof. The router (not shown) may be configured to differentially manage provisioned traffic from a PWS-authenticated mobile station, such as DMMS 125, and also may offer virtual LAN (VLAN) functions. The aforementioned IEEE Stds. 802.1p and 802.1q are hereby incorporated herein in their entirety. DMAP 120 may be configured to accept provisioned service traffic from one or more PWS-authenticated mobile stations, such as DMMS 125, and to reject non-provisioned service traffic. DMAP 120 also may be a constituent of a multifunction dual-mode wireless service apparatus in which the aforementioned router (not shown) also is a constituent device cooperating with DMAP 120.

Also disposed on the premises of PSS 115 can be subscriber home network (SHN) 140, which may subsume, and may be at least partially co-located with USW 117. SHN 140 home can include subscriber home telephone 142. If telephone 142 is an analog device, an adaptor such as foreign exchange system gateway (FXS) 144, may be coupled between SHN 140 and telephone 142. An FXS gateway can be adapted to connect a standard analog telephone or fax machine to a digital, IP-based data networks, and, can be exemplified by Linksys® SPA1001 Phone Adapter, produced by Cisco/Linksys®, Irvine, Calif. FXS 144 enables a user to communicate with other digital communication devices to which FXS 144 is coupled, such as DMAP 120. Advantageously, using an adaptor such as FXS 144, PSS 115 can use telephone 142 to remotely control, configure, and operate DMAP 120, at least in part, including supplying activation and security codes to DMAP 120. Conveniently, telephone 142 may be located in a room or office, on the premises of PSS 115, remote to DMAP 120 but coupled to SHN 140. SHN 140 also may include computer 146, irrespective of type or configuration (e.g., desktop, laptop, personal digital assistant), or mode of connection (e.g., wired or wireless). DMAP 120 may Computer 146 may be dispositioned with the appropriate hardware and software, which may be useful in communicating with, and at least partially configuring, DMAP 120. Also, PSS 115 may have, as part of SHN 140, wireless handset 148, which may possess dual mode mobile station functionality, or may operate as a communicating device on USW 117. Handset 148 may be adapted to allow PSS 115 to modify a configuration of DMAP 120. DMAP 120 further may be a constituent of a multifunction dual mode wireless service apparatus, which includes one or more functions of an analog telephone adaptor (ATA), having FXS and outgoing foreign-service office (FXO) features, but which may be adapted to receive signals from analog telephony devices coupled thereto, which signals can be used to modify or configure the operation or function of DMAP 120, including activating DMAP 120 for an authentication period.

DMAP 120 can include subscriber interface 160, transceiver 155, and local authenticator (LA) 150. Desirably, subscriber interface 160 includes features such as manual entry keys, and a display, which may be a screen display or other display providing DMAP-related information and feedback to PSS in a visually perceivable format. Advantageously, all or part of subscriber interface 160 may be provided in hardware, software, or an operable combination thereof. In addition, subscriber interface 160 may be a distributed interface, in that a portion of interface 160 can be implemented on computer 146, for example, in a web browser interface. This convenient functionality can allow PSS 115 to remotely control, configure, and operate DMAP 120, at least in part, including supplying activation and security codes to DMAP 120. Conveniently, computer 146 may be located in a room or office, on the premises of PSS 115, remote to DMAP 120 but coupled to SHN 140. Typically, DMAP 120 includes transceiver 155, configured to bidirectionally wirelessly communicate with associated and supplicant wireless devices, including DMMS 125. DMAP 120 also may wirelessly communicate with computer 146 and PSS wireless handset 148 if the respective devices are configured and disposed to do so. Local authenticator (LA) 150 is a processing unit of DMAP 120, adapted to perform one or more of effecting association of supplicant wireless devices with DMAP 120 in the context of USW 117; facilitating recognition, verification, and differentiation of signals from associated devices; and to preserve and manage connectivity among associated devices coupled to DMAP 120. Moreover, LA 150 can be adapted to authenticate, in a first authentication mode, or to facilitate authentication, in a second authentication mode, of supplicant devices including DMMS 125. Also, upon authentication of DMMS 125, LA 150 can be configured to provision PWS token 127 to DMMS 125, or to pass PWS token 127 to DMMS 125, after DMMS 125 is authenticated by a PSP, such as MWSP 105 or PSV 112.

It may be desirable to differentiate between PWS and non-provisioned services, with the latter being provided, for example, by ISP 129. It also may be desirable to further differentiate between different types or classes of PWS provided by the same PSP (e.g., MWSP 105, PSV 112) or between the same type or class of PWS provided by a first PSP, e.g., MWSP 105, and a second PSP, e.g., PSV 112. To facilitate explanation of differentiated service management, PWS hereafter are referred to a "voice services," and non-provisioned services hereafter are referred to a "data services." Currently, wireless devices such as DMAP 120, typically employ a unique, typically alphanumeric, identifier, called a service set identifier (SSID) that wireless networking devices use to establish and to maintain wireless connectivity. Multiple access points on a network or sub-network, including DMAP 120, can use the same SSID to identify the particular wireless network which it forms or with which it is associated. An access point, including DMAP 120, also can employ a unique identifier, namely a basic service set identifier (BSSID) to distinguish itself from other wireless network access points. DMAP 120 can be configured with a basic service set, relative to wireless networking devices, such as DMMS 125, which may seek to associate with DMAP 120. By extension, the basic service set of DMAP 120 may be uniquely identified with a basic service set identifier (BSSID) that may be used in a manner similar to a medium access controller (MAC) address relative to other base stations. Embodiments of the present invention can be implemented where DMAP 120 is capable of producing a single SSID, which implementation may provide one undifferentiated service channel adapted to convey both provisioned data and non-provisioned data. Desirably, DMAP 120 can be capable of producing multiple SSIDs and BSSIDs. Exemplary access points capable of producing multiple, configurable SSIDs include the CISCO AIRONET 1100 Series Access Point, the LINKSYS WRTP54G Wireless Router with VoIP, and the LINKSYS WAP54GP Wireless-G Access Point, both available from Cisco Systems, Inc., San Jose, Calif.

In that regard, DMAP 120 may be configured to have a data-service BSSID (dBSSID 170) to identify a basic service set established for non-provisioned signal (e.g., data) communication; and a host voice-service BSSID (hvBSSID 180) to identify a basic service set established for signal communications related to provisioned wireless services, e.g., voice services. Separation of data and voice services can be advantageous when it is desirable, as here, to separately manage non-provisioned and provisioned traffic. Thus configured with plural BSSIDs, DMAP 120 can perform content filtering. In addition, it may be desirable to assign multiple hvBSSIDs 180 to DMAP 120, permitting further differentiation of provisioned services, for example, based upon predefined content characteristics. LA 150 also can include data service interface 162 and provisioned service interface 164. Data service interface 162 generally recognizes and processes data and non-provisioned service content, such that PSS 115 may have control over, and associated privacy of, the content of signals directed to dBSSID 170. Data service interface also can process traffic from SHN 140, and can direct voice service signals therefrom to provisioned service interface 164. Provisioned service interface 164 generally recognizes and processes provisioned service content, such as voice services, such that the respective PSP (e.g., MWSP 105 or PSV 112) has control over the content of signals directed to hvBSSID 180.

Desirably, vBSSID numbers may be assigned in a manner similar to MAC addresses, i.e., a range of vBSSID values for dual-mode access points, such as DMAP 120, can be allocated to defined entities, such as a PSV 112 or mobile wireless service provider (MWSP) 105. Thus, each dual mode access point, such as DMAP 110, may be provided with at least one respective unique vBSSID, such as hvBSSID 180. Typically, BSSIDs are programmable into an access point and, thus, DMAP 120 may have hvBSSID 180 pre-assigned thereto, for example, before it is placed in USW 117 for use by PSS 115. Alternately, a PSP, such as MWSP 105, or PSV 112, may remotely configure DMAP 120 by assigning a unique hvBSSID 180 as part of a registration process, and thereby establish provisioned service filtering, e.g., voice-service filtering, in DMAP 120. The registration process may be part of aforementioned CPE configuration and management process, in accordance with a remote management protocol, such as TR-069 CPE WAN Management Protocol. In this example, it is desirable to include in DMAP 120 managed CPE device interface 190 that can initiate and maintain filtering to implement differentiated content management, in accordance with CPE-side configuration management and maintenance functions, similar to those described in DSL Forum Technical Report TR-064. In a particular example, through the facility of interface 190, a PSP, such as MWSP 105 and PSV 112, may remotely provision services and functions of DMAP 120 in accordance with provisioning parameters for VoIP CPE services (e.g., DSL Forum Technical Report TR-104), with VoIP signals being processed differentially from others, and managed according to a VoIP provisioning agreement between the selected PSP and PSS 115. With voice-service filtering, signals received over USW 117 and directed to hvBSSID 180 can be managed, metered, and transmitted over WLN 110 to the respective PSP, e.g., PSV 112 or MWSP 105. Suitable voice signals for such voice-service filtering, can include voice-over-Internet-Protocol (VoIP) signals, as well as related voice traffic, such as voice-over-WLAN (VoWLAN) signals. Advantageously, signals not directed to hvBSSID 180 may not be controlled, altered, or affected by voice-service filtering. Accordingly, the radio set of DMAP 120, as represented of transceiver 155, may establish and manage a voice channel for provisioned voice signals (e.g., VoIP signals) separately from a data channel for non-provisioned signals (e.g., bulk data packet signals). Interface 190 may conveniently be disposed and operable within LA 150.

DMAP 120 may broadcast to indicate availability to provide wireless service. While broadcasting, DMAP 120 can transmit over voice channel 182, for example, a voice beacon bearing vSSID 178 to supplicant devices, associated devices, or both, thereby identifying voice channel 182. Similarly, DMAP 120 can transmit over data channel 184, for example, a data beacon bearing dSSID 170 to supplicant devices, associated devices, or both, thereby identifying data channel 184. Accordingly, an exemplary supplicant wireless device, which may be DMMS 125, can identify one or more appropriate channels 182, 184 over which to communicate with DMAP 120. Exemplary DMAP 120 can provide, through voice service interface 164, a voice-service channel 182 typically identified by vSSID 178 and, through data service interface 162, a data-service channel 184 typically identified by dSSID 170.

It can be expedient to allocate and assign a range, or block, of vBSSID values to an identified DMMS entity including, for example, a DMMS manufacturer, DMMS distributor, DMMS vendor, DMMS service provider, PSV 112, and MWSP 105. By associating a vBSSID in this way, gvBSSID 195 may be indicative of the provider of DMMS 125, its corresponding service capabilities, and its corresponding appliance feature sets (e.g., VoIP, MMS, video, GPS). Beneficially, DMMS 125 can be assigned unique vBSSID, for example, gvBSSID 195, as a virtual MAC address corresponding to and identifying DMMS 125. gvBSSID 195 may indicate that DMMS 125 corresponds to a series of VoIP-capable appliances of a particular manufacture; is capable of SIP-based VoIP messaging; and was supplied to guest 163 within the context of an agreement with PSV 112. Embodiments of the present invention can be implemented to configure DMAP 120 to provision, to accept, or to reject specific services to selected gvBSSID identifiers. Selection or rejection of a particular gvBSSID may be accomplished using well-known MAC filtering techniques or functional equivalents thereof. For example, DMAP 120 can be configured by PSV 112, to reject voice-service requests from those DMMS bearing gvBSSID identifiers which denote dual-mode appliances not within the scope of a voice-service agreement with PSV 112. MWSP 105 and other PSP may be able to similarly interact with DMAP 120, or the remotely managed functions of DMAP 120 may be exclusively under the control of PSV 112.

For numerous reasons, Guest 123 may wish to receive authorization to use PWS on DMMS 125. One exemplary reason may arise from DMMS 125 being located out of range of signals from SRAN 108. For example, Guest 123 may be indoors or may be in a foreign geographic region where RAN signals compatible with DMMS 125 may be unavailable. USW 117 may be disposed in a public venue such as an airport or large shopping plaza, for example, and PSS 115 may operate USW 117 in that venue. USW 117 also may be disposed outdoors, owing to the deployment of fixed wireless "neighborhood area" or "metropolitan area" networks currently undergoing widespread deployment, as well as more robust WiFi™ equipment. Conveniently, Guest 123 may be able to communicate with DMAP 120 over USW 117 using DMMS 125, and thus may seek to be provisioned with PWS, including, for example, an allocation of VoIP services, in order to make and receive calls while in range of USW 117 or a compatibly interoperating USW. Similarly, Guest 123 may wish to receive non-voice PWS (e.g., priority stock market feeds available from PSV 112), which may not otherwise be available to Guest 123 through services offered by PSS 115 through ISP 129. Alternatively, Guest 123 may be a guest in the private home of PSS 115, and PSS 115 may wish to transfer PWS token 127 to DMMS 125 of Guest 123. PWS token may be representative of a portion of preallocated PWS or credit for PWS, for which accounting may be maintained in DMAP 120 for PSS 115, or in a PWS account of PSS 115 managed by a PSP, such as MWSP 105 or PSV 112.

Beneficially, DMMS 125 can be configured to facilitate DMAP 120 with provisioning voice service (as an exemplary PWS) to DMMS 125 by adapting to communicate voice signals through provisioned service interface 164 by way of DMAP voice channel 182, which may be identified by vSSID 178. Similarly, DMMS 125 may seek to associate with DMAP 120 and to communicate data signals through data service interface 162, using data channel 184 that can be identified by dSSID 155 and be configured separately and distinctly from voice channel 182. As indicated above, some form of authentication can be desirable for wireless communication services, particularly for provisioned services, such as voice services (e.g., VoIP services), which may use a potentially vulnerable wireless link. DMMS 125 may facilitate DMAP 120 provisioning of voice services by supplying to DMAP 120 identifying credentials during association supplication or upon request of DMAP 120. Identifying credentials may include a predetermined pass code, a predefined unique supplicant device identifier, and a combination thereof. DMAP 120 may store therein one or more pass codes and one or more predefined unique supplicant device identifiers corresponding to wireless devices that may be authenticated to DMAP 120. Authentication of DMMS 125 to DMAP 120 can be designated "PWS authentication." By providing identifying credentials, PWS authentication of the identity of supplicant device DMMS 125 can be simplified, potentially expediting authorization of DMMS 125 to be provisioned with PWS. It also may be beneficial to perform a "pre-access authorization," which may include, for example, authenticating the identity of Guest 123 using well-known authentication methods, with a successful pre-access authentication being followed by PSS 115 providing Guest 123 a PWS authentication pass code.

In a particular example of advantageous inventive embodiments herein, Guest 163 may desire to use DMMS 125 through DMAP 120 to receive provisioned voice services (e.g., VoIP) across USW 117. Although DMMS 125 may be able to couple to mobile wireless link 109 to receive voice services from MWSP 105, Guest 123 may wish to place a VoIP call through DMAP 120 and across WLN 110, perhaps because of a lower tariff charged by MWSP 105 for IP-based traffic. PSV 112 may be capable of provisioning PWS, such as VoIP voice service, to DMMS 125, for example, as a discount vendor of MWSP 105 services. PSV 112 may coordinate such third party provisioning with the MWSP AAA entity 103, so that DMMS 125 can be authorized to make and receive VoIP calls using the facilities of MWSP 105. Typically, communications between PSV 112 and MWSP AAA 103 are made using secure communication techniques, with safeguards against Internet interlopers and miscreants. Both PSV 112 and MWSP AAA 103 may decline to provision PWS requested by an outside party, such as Guest 123, unless sufficient safeguards are undertaken, including authenticating the identity of a requester, of the supplicant device for which the provisioned service is requested, or both. Therefore, to satisfy a desire of MWSP 105 and PSV 112 for secure access to provisioned services, it may be expedient to provide authentication of supplicant device DMMS 125 as it requests to be provisioned, PWS through DMAP 120, including voice service over IP-based WLN 110. PSS 115 also may desire safeguards operable with DMAP 120 to reduce the likelihood of intrusion into USW 117 by a miscreant seeking to misappropriate or misuse assets associated with DMAP 120, including for example, PWS token 127 or sensitive data and access information of PSS 115, relating to service provisioning through DMAP 120 with a PSP. At the same time, from the perspective of Guest 123 and also of PSS 115, it can be desirable to simplify the mechanics of these safeguards, particularly in scenarios where PSS 115 and Guest 123 can cooperatively operate DMAP 120 and DMMS 125, respectively, to facilitate PWS authentication of DMMS 125 for PWS provisioning, including supplying PWS token 127. In one exemplary scenario, which may be useful in circumstances where PSS 115 is a business owner offering a hotspot to customers or other transient persons, PSS 115 can verify the identity of Guest 123, that is perform pre-access authentication of Guest 123, using an identification credential such as a vehicle operator's permit (i.e., driver's license), a passport, or other form of identification suitable for the level of security desired. Biometric and other physical personal authentication techniques may be used in addition or in substitution. PSS 115 may not require Guest 123 to produce an identification credential for pre-access authentication, for example, where Guest 123 is a long-time customer, or where USW 117 is disposed in the home of PSS 115 and Guest 123 is person known to PSS 115. Upon a satisfactory pre-access authentication, or if PSS 115 is willing to proceed based on trust of Guest 123, then PSS 115 may offer Guest 123 an identification credential to be used with DMMS 125 during PWS authentication, that is, when Guest 123 operates DMMS 125 to request PWS from a PSP. Pre-access authentication may be a constituent process component of a simple but exemplary PWS authentication method embodiment according to the present invention. However, it is to be understood that PWS authentication of Guest 123 using DMMS 125 by DMAP 120 according to embodiments of the present invention is desirably a user-level authentication that does not require pre-authentication.

An exemplary PWS authentication method embodiment according to the present invention may proceed when PSS 115 activates DMAP 120 by depressing single key 177. Conveniently, activation key 177 may be dedicated to facilitating association of DMMS 125 with DMAP 120. In response to activation by key 177, DMAP 120 may broadcast, for a predefined authentication period, a voice beacon bearing vSSID 178 on voice channel 182. It can be beneficial to limit the predefined authentication period, for example, to about three minutes, to provide sufficient time for DMMS 125 to perform USW-authentication and to become associated with DMAP 120, yet to minimize the ability of a miscreant or interloper having a USW-capable device from associating with DMAP 120. The actual length of the predefined authentication period may be adjustable to meet the operating environment in which DMAP 120 is deployed. During the predefined authentication period, DMMS 125 can similarly be activated, for example, by Guest 123, causing DMMS 125 to become a supplicant device to the wireless network (USW 117) represented by DMAP 120, identifiable by broadcasting a supplicant device probe request frame on every available USW radio channel, including DMAP 120 voice channel 182. In response, DMAP 120 can transmit a voice beacon over voice channel 182 bearing vSSID 178, as a probe response frame. DMMS 125 then may select DMAP 120 for voice-service access and may send an open authentication request, a form of USW-authentication, to DMAP 120. Typically, open authentication is directed to facilitating connectivity and, once in communication with DMMS 125, LA 150 in DMAP 120 can provide a favorable authentication reply to DMMS 125. Upon successful USW-authentication, DMMS 125 may send an association request frame to DMAP 120, transmitting gvBSSID 195, which also may indicate a request to be provisioned voice-service, for example, in the form of PWS token 127 by DMAP 120, where DMAP 120 is configured to provision PWS token 127, or through DMAP 120 over data network link 120, where a PSP such as MWSP 105 or PSV 112 may be designated to engage DMMS 125 in AAA functions to establish authorization to be provisioned the requested wireless service (e.g., voice service). DMAP 120 may have stored therein gvBSSID 195, corresponding to DMMS 125, and it may be sufficient for selected embodiments of PWS authentication methods that gvBSSID 195 identifies DMMS 125 as a dual-mode device, which can be permitted to request, and to be provisioned PWS token 127 and that receipt by DMAP 120 of an identification credential from DMMS 125, in the form of gvBSSID 195, can authenticate supplicant device DMMS 125 to DMAP 120. If the request of DMMS 125 is unsuccessful (e.g., signal loss or authentication failure) during the predefined authentication period, DMAP 120 may permit to DMMS 125 having gvBSSID 195, to continue authentication and association attempts, until the predefined authentication period expires, while denying access to other supplicant devices seeking access but without gvBSSID 195.

Alternatively, PSS 115 may enter a host pass code into DMAP 120 by way of interface 160, which is stored by LA 150 during a predefined authentication period. PSS 115 can issue to Guest 123 a guest pass code that is the same as, or corresponds to, the host pass code entered by PSS 115 into DMAP 120. As Guest 123 activates DMMS 125 to become a supplicant device, Guest 123 enter the guest pass code into DMMS 125. When DMMS requests to associate with DMAP 120 during the authentication period, DMMS 125 can undertake a USW-authentication with DMAP 120, in accordance with the network authentication and encryption protocols employed in USW 117. In addition, DMMS 125 can implement an embodiment of the inventive PWS authentication methods by transmitting the guest pass code to DMAP 120. LA 150 can process the guest pass code received from DMMS 125 and compare it with the host pass code supplied by PSS 115. Upon a favorable comparison, DMMS 125 can be considered to be an authenticated device. DMMS 125 may transmit gvSSID 195 along with the guest pass code as a component of the PWS authentication identification credentials, or may transmit gvBSSID 195 subsequently, after LA 150 indicates a favorable comparison of guest pass code to stored host pass code. If pre-access authentication is employed to authenticate the identity of Guest 123, then pass code-type PWS authentication of DMMS 125 can be sufficient to infer verification of the identity of Guest 123, if such security is indicated. Otherwise, pass code-type authentication can be sufficient to verify the identity of DMMS 125. Foreseeable variations of the foregoing authentication techniques may be employed, including using biometric authentication devices coupled to DMMS 125 or DMAP 120, for example, as an adjunct to or in substitution for, codes provided by PSS 115. Even if USW-authentication and PWS authentication processes are successfully completed between DMAP 120 and DMMS 125, a successful exchange of encryption keys, such as through a WEP security encryption protocol, may be additionally implemented to permit DMMS 125 to successfully exchange voice services through DMAP 120 over wired network 120. As used herein, the term USW-authentication can include network authentication and encryption protocols such as, without limitation, WEP, WPA, WPA2, IEEE Std. 802.11i, IEEE Std. 802.1x, RADIUS, and EAP security protocols.

Although the identity of DMMS 125 may be verified, it may not be authorized (or capable) of receiving the requested PWS. Thus, LA 150 may examine gvBSSID 195 to determine whether the identity of DMMS 125 corresponds to a type of DMMS permitted to receive PWS token 127. Alternatively, DMAP 120 may direct gvBSSID 195 as an identifying credential to the PSP identified as being designated to provision PWS for requests coming from DMAP 120. e.g., PSV 112. Also, DMAP 120 may be configured by PSV 112, to examine gvBSSID 195 and to determine whether to provision DMMS 125 with requested PWS (e.g., voice services) over WLN 110, once DMMS 125 has been PWS-authenticated. In addition, embodiments of the present invention may receive or request from DMMS 125 other information which may be pertinent to determining whether to provision PSW to authenticated device DMMS 125, for example, whether authenticated device DMMS 125 is associated with an active subscription between Guest 123 and the provisioning PSP, the class of service requested, QoS requirement, the number of tokens to be allocated, etc. In certain exemplary embodiments of PSW authentication, DMAP 120 may use gvBSSID 195 to perform a type of MAC address authentication, in which the gvBSSID 195 of DMMS 125 is verified against a locally configured list of allowed guest vBSSIDs, or against AAA information maintained on an external authentication server, for example, of PSV 112, MWSP 105, or of MWSP AAA 103 (for convenience, simply "PSV 112"). Alternatively, as another embodiment of PSW authentication, DMAP 120 may communicate gvBSSID 195 to PSV 112, where approval or rejection of DMMS 125 may be made, based on a variety of criteria. Moreover, DMAP 120 may be configured to permit enrollment of selected DMMS 125, that is, to enter gvBSSID 195 on the locally configured list of DMAP 120, or to facilitate enrollment of DMMS 125 by forwarding gvBSSID 195 to PSV 112. Enrollment may permit DMAP 120 or PSV 112 to grant or transfer PWS access credits, including representations thereof (e.g., PWS token 127), to DMMS 125, which may permit DMMS 125 to receive voice services (e.g., make and receive VoIP calls) through DMAP 120, or to otherwise be provisioned by PSV 112 to use voice services over suitable USW other than USW 117. If DMAP 120 confirms, or is notified by PSV 112, that DMMS 125 is permitted to associate with DMAP 120, then USW-authentication may be employed. In alternative embodiments of the present invention, USW-authentication may be performed prior to PSW authentication.

Figure 2:
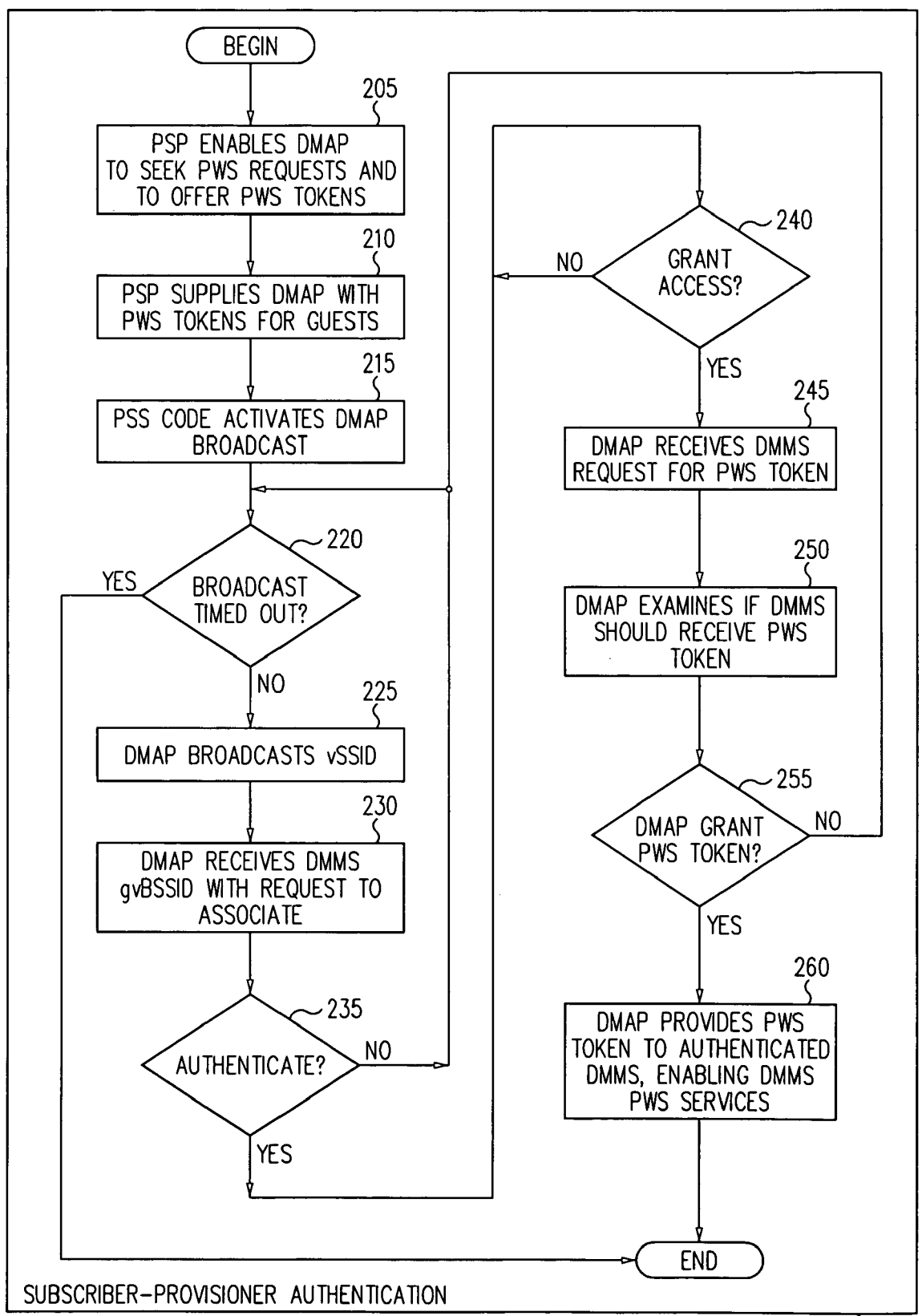
FIG. 2 is a generalized flow diagram of a subscriber-provisioner dual-mode authentication operation, according to an embodiment of the present invention.

FIG. 2 illustrates an embodiment of an authentication method 200 according to the present invention, namely, subscriber-provisioner DMAP PWS authentication method 200, which also may feature PWS provisioning. FIG. 2 is described with respect to FIG. 1 and the reference numerals of FIG. 2 refer to like entities in FIG. 1. Method 200 may be beneficial, for example, when a voice-services subscriber seeks to facilitate and manage the allocation of provisioned voice and selected IP services to a guest, while selectively controlling provisioning functions at the subscriber location. Method 200 may also be desirable, for example, to a small business owner, for example, PSS 115, hosting a wireless networking hotspot, for example, USW 117, through which allocation units of VoIP and other provisioned services may be purchased by customers of the small business. As used with respect to FIG. 1, a voice-service allocation unit can be designated as a "token," such as PWS token 127. Pursuant to a request or agreement by PSS 115, DMAP 120 may be authorized and configured (Step 205) by a PSP, such as PSV 112 or MWSP 105, to seek voice-service requests from supplicant devices, such as DMMS 125, and to offer to authenticated supplicant devices PWS token 127, which can be a voice-service token.

Once configured, the PSP may supply DMAP 120 with PWS tokens or functional equivalents (Step 210), which may be requested by Guest DMMS. It may be beneficial for PSS 115 to purchase selected quantities of PWS token 127, perhaps at a discount, for example, through a volume-purchaser discount agreement with a preselected PSP, e.g., MWSP 105. In addition, PSS 115 may have a defined block of provisioned service credits (e.g., PWS tokens 127) associated with an account with MWSP 105, which may be managed by MWSP AAA unit 103 and which may be supplied to properly authenticated supplicants, for example, who request PWS. Therefore, MWSP 105 can authorize DMAP 120 (step 205) to offer a defined quantity of PWS tokens to properly authorized and authenticated guest devices, such as DMMS 125. MWSP 105 also may associate with DMAP 120 a predetermined number of PWS token 127 for provisioning to DMMS 125, in addition to performing other configurations to DMAP 120, for example, in accordance with CPE management protocols, e.g., TR-064, TR-069, and TR-104.

In embodiments of PWS authentication method 200, subscriber PSS 115 can activate DMAP 120 (Step 215), for example, by entering a pass code. When activated, DMAP 120 can be enabled to broadcast availability for association requests and to accept requests for association from supplicant devices for a predefined authentication period (step 220). During the predefined authentication period, DMAP 120 can broadcast vSSID 178 (step 225) to indicate its availability for voice-service calls 182. A supplicant device, such as DMMS 125 may reply to DMAP 120 by supplying identifying credentials which may include, or be supplemented by, one or both of a pass code or gvBSSID 195 (step 230). Desirably, PSS 115 can provide the pass code to Guest 123, who enters the pass code into DMMS 125. DMAP 120 can receive the request to associate, along with the pass code, transmitted by DMMS 125, within the predefined authentication period. DMAP 120 can employ LA 150 to evaluate the identifying credentials received from DMMS 125, for example, to perform PWS authentication (step 235). Step 235 also may include USW-authentication. If the pass code supplied by DMMS 125 satisfactorily compares with an authentication credential stored in a first memory in DMAP 120 during the authentication period, then DMMS 125 can be considered to be authenticated. If, on the other hand, the comparison is unsatisfactory, DMMS 125 may reattempt to be authenticated within the predefined authentication period. The authentication period may be terminated once the authentication of DMMS 125 is successful, for example, to deter interlopers. The (first) authentication credential can include the pass code provided to Guest 123 by PSS 115; an authentication certificate, identifier, or symbol supplied securely by MWSP 105 or PSV 112; or a combination thereof. DMMS 125 also may supply DMAP 110 with an additional identifying credential concurrently with the pass code, or in response to a communication separate in time from DMMS 125 supplying the pass code. Exemplary additional identifying credentials include, without limitation, gvBSSID 195, a PWS subscriber identifier (not shown), and a unique personal identifier, such as a vehicle operator's license). LA 150 can include a second memory in which to store a second authentication credential, used to evaluate an additional identifying credential. In selected embodiments of the present invention, successful PWS authentication may be completed after LA 150 verifies the pass code, the additional identifying credential, or both.

Upon successful authentication of the identifying credentials of DMMS 125, it is desirable to determine whether supplicant device DMMS 125 is a supplicant device suitable to be granted access to PWS resources (step 240), including receiving relevant information from DMMS 125, including, for example, gvBSSID 195 and the terms of the PWS request (class of service, QoS, number of tokens, etc.). LA 150 can process the information gathered from DMMS 125 at Step 245, to determine whether DMMS 125 should receive PWS token 127 (step 250), as well as how many PWS token 127 and other terms of PWS provisioning. In embodiments of the present invention, LA 150 may store a list or template of gvBSSID values indicative of wireless devices which may be authorized by MWSP 105 to receive PWS token 127 from DMAP 120. LA 150 also may evaluate gvBSSID 195 to determine whether DMMS 125 is capable of using the requested PWS resources or is limited by capability or by agreement in gaining access to PWS resources. Such a list or template can be dynamically updated via WLN 110 by WMSP 105, or MWSP AAA 103.

Where LA 150 determines that the PWS request of DMMS 125 can be fulfilled (step 255), then DMAP 125 can provide voice service PWS token 127 to DMMS 125 (step 260), permitting DMMS 125 to use PWS in an allocation corresponding to granted PWS token 127. On the other hand, where LA 150 determines at Step 255 that the PWS request of DMMS 125 cannot be fulfilled, it may be desirable to permit DMMS 125 to re-attempt a request to receive an allocation of PWS before the predefined authentication period elapses (step 220). Once DMMS 125 is provisioned PWS token 127, it may be desirable to terminate the predefined authentication period, for example, to deter miscreant operators of a USW wireless device from seeking to interlope on USW 117 or impermissibly gain access to PWS.

Figure 3:
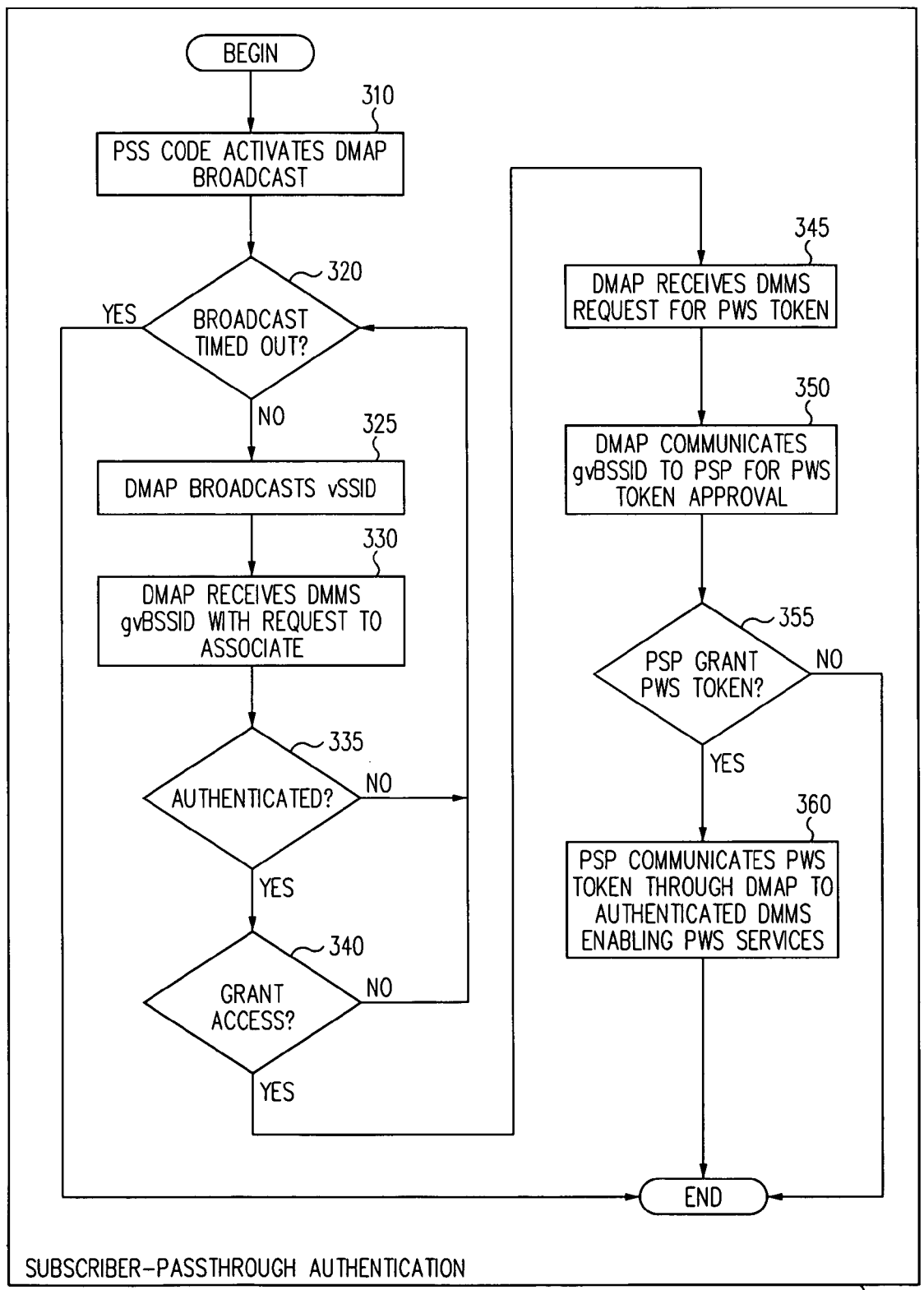
FIG. 3 is a generalized flow diagram of a subscriber-passthrough dual-mode authentication operation, according to another embodiment of the present invention.

FIG. 3 illustrates another embodiment of an authentication method 300 according to the present invention, namely subscriber-passthrough DMAP PWS authentication method 300, which also may feature PWS provisioning. Similar to FIG. 2, FIG. 3 is described with respect to FIG. 1 and the reference numerals of FIG. 3 refer to like entities in FIG. 1. Method 300 may be beneficial, for example, when a voice-services subscriber seeks to facilitate and manage the allocation of provisioned voice and selected IP services to a guest, while passing through authentication and provisioning functions to a designated PSP, such as MWSP 105 or PSV 112.

As used with respect to FIG. 1, a voice-service allocation unit can be designated as a "token," such as PWS token 127. Method 300 may also be desirable, for example, to a small business owner PSS 115, hosting a wireless networking hotspot, such as USW 117, but where PSS 115 does not desire to resell PWS tokens. Method 300 also may desirable where PSS 115 operates a home network and wishes to facilitate a request of Guest 123 to receive PWS tokens 127 for DMMS 125, but not to be a host-provisioner. To commence an embodiment of the present inventive methods, namely an embodiment of a subscriber-passthrough DMAP PWS authentication method, subscriber PSS 115 can activate DMAP 120 (Step 310), for example, by entering a pass code. Activation of DMAP 120 can continue for a predefined authentication period (step 320). When activated, DMAP 120 can broadcast vSSID 178 to indicate availability (Step 325) for association requests and to accept requests for association from supplicant devices, including DMMS 125, for example, to make and receive voice-service calls over voice channel 182. A supplicant device, such as DMMS 125, may reply to DMAP 120 by supplying identifying credentials within the predefined authentication period. DMMS 125 identifying credentials may include, or be supplemented by, one or both of a pass code or gvBSSID 195 (step 330).

Desirably, where a pass code is employed, PSS 115 can provide the pass code to Guest 123, who enters the pass code into DMMS 125. PSS 115 may supply the pass code to Guest 123 subsequent to a successful pre-access authentication. DMAP 120 can receive the request to associate, along with the pass code, transmitted by supplicant device DMMS 125, and can employ LA 150 to evaluate the identifying credentials received from DMMS 125, for example, to perform PWS authentication (step 335). Step 335 also may include USW-authentication, as described with respect to Step 235 in FIG. 2. If the pass code supplied by DMMS 125 satisfactorily compares with the pass code stored in DMAP 120 during the authentication period, then DMMS 125 can be considered to be authenticated. If, on the other hand, the comparison is unsatisfactory, DMMS 125 may reattempt to be authenticated within the predefined authentication period. The authentication period may be terminated once the authentication of DMMS 125 is successful, for example, to deter interlopers. Also, it may be desirable to terminate the authentication period upon a failed authentication attempt.

Upon successful authentication of the identifying credentials of DMMS 125, it is desirable to determine whether supplicant device DMMS 125 is a supplicant device suitable to be granted access to PWS resources (step 340), which can be indicated by gvBSSID 195. Upon a favorable evaluation of DMMS 125 suitability to access PWS resources, LA 150 may receive DMMS 125 request (Step 345) for a PWS token 127, e.g., a voice service token. The request may include, without limitation, gvBSSID 195 and the terms of the PWS request (class of service, QoS, number of tokens, etc.). LA 150 can pass through (Step 350) gvBSSID 195, and other information, including that collected at Step 345, to a designated PSP, such as MWSP AAA 103 and PSV 112. PSW authentication, as well as provisioning of PSW tokens 127, can be performed and managed (Step 355) by the designated one of MWSP AAA 103 or PSV 112. Such PSP authentication and provisioning may be desirable to Guest 123, for example, where Guest 123 is a subscriber to PWS services of MWSP 105 or PSV 112, and may be using USW 117 and DMAP 120 to access PWS tokens 127, which may be associated with an existing PWS provisioning account of Guest 123 for DMMS 125.

Upon a favorable authentication and provisioning of PWS tokens 127 on behalf of DMMS 125 at Step 355, the designated PSP may then communicate PWS tokens 127 through to DMAP 120 which, in turn, transmit the requested PWS tokens 127 to DMMS 125 (Step 360). Once DMMS 125 is provisioned PWS token 127 at Step 360, it may be desirable to terminate the predefined authentication period, for example, to deter miscreant operators of a USW wireless device from seeking to interlope on USW 117 or impermissibly gain access to PWS. It also may be desirable to permit DMMS 125 to re-attempt authorization during the predefined authentication period, as well as to terminate the authentication period upon an unsuccessful authentication attempt.

A variety of hardware and software functions have been described herein. Depending upon the implementation, many of the hardware functions may be emulated using software. Likewise, software functions may be performed using hardware components having hardwired circuitry; and some of the hardware or software functions may be configured using alternative technologies known to skilled artisans, including without limitation, firmware and application specific integrated circuits. The elements in the Figures are to be taken as logical and thus, can be implemented in a consolidated or distributed manner to achieve a desired result.

Moreover, many alterations and modifications may be made by those having ordinary skill in the art, without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth, but all equivalent elements for performing substantially the same function in substantially the same way to obtain substantially the same result. The claims are thus to be understood to include what is specifically illustrated and described above, what is conceptually equivalent, and also what incorporates the ideas of the invention.

What is claimed is:

1. A fixed wireless access point for use in an unlicensed spectrum wireless (USW) network, comprising:
a subscriber interface configured to communicate with a subscriber to receive an authentication credential from the subscriber;
a dual mode transceiver configured to communicate with a guest via a dual mode mobile station;
a local authenticator configured to communicate with the dual mode mobile station via the dual mode transceiver;
a provisioned service interface coupled to the local authenticator, wherein the provisioned service interface is configured to provide a provisioned service channel identifiable by a voice-service provisioned service set identifier (vSSID); and
a non-provisioned service interface coupled to the local authenticator, wherein the non-provisioned service interface is configured to provide a non-provisioned service channel identifiable by a data-service provisioned service set identifier (dSSID),
wherein the local authenticator is configured to be activated by the subscriber via input of the authentication credential to the subscriber interface,
wherein the subscriber is authorized to operate the fixed wireless access point in the USW network,
wherein the local authenticator is configured to receive an identifying credential from the guest via communication with the dual mode mobile station after activation by the subscriber,
wherein the local authenticator is configured to store the authentication credential,
wherein the local authenticator is configured to analyze the identifying credential received from the guest, thereby determining an authentication state resulting therefrom,
wherein analyzing the identifying credential includes comparing the identifying credential with the stored authentication credential, and
wherein the local authenticator is configured to selectively grant the guest access to or deny the guest access to the USW access point including the provisioned service channel and the non-provisioned service channel via the dual mode mobile station based on the authentication state.

2. The USW access point of claim 1, wherein the local authenticator is configured to differentially process a signal communicated with the dual mode mobile station in response to the authentication state.

3. The USW access point of claim 2,
wherein the provisioned service interface is configured to differentially process the provisioned service signal in response to the authentication state.

4. The USW access point of claim 3:
wherein the provisioned service interface is configured to correspond to a provisioned service basic service set identifiable by a host voice-service provisioned service basic service set identifier (hvBSSID),
wherein the hvBSSID corresponds to the vSSID and is configurably unique to the provisioned service interface, and
wherein the signal communicated with the dual mode mobile station is a provisioned service signal communicated over the provisioned service channel to the USW access point corresponding to hvBSSID.

5. The USW access point of claim 4, wherein the provisioned service interface is configured to accept the identifying credential within a predefined authentication period and configured to determine an authentication state corresponding to an identifying credential, if accepted within the predefined authentication period.

6. The USW access point of claim 3, wherein the local authenticator further comprises a managed customer premises equipment (CPE) interface coupled to a provisioned service provider and coupled to the provisioned service interface, the managed CPE interface being remotely configurable by the provisioned service provider, the managed CPE interface modifying differential processing of the provisioned service signal in response to the authentication state.

7. The USW access point of claim 4, wherein the identifying credential comprises a guest voice-service provisioned service basic service set identifier (gvBSSID) configurably unique to the dual mode mobile station, and wherein the managed CPE interface is configured to modify differential processing of the provisioned service signal in response to the gvBSSID.

8. The USW access point of claim 5 configured such that a single keystroke on a key coupled to the provisioned service interface commences the predefined authentication period and activates the provisioned service interface to determine the authentication state corresponding to the identifying credential, if accepted within the predefined authentication period.

9. A method for authenticating to a USW access point, a dual mode mobile station seeking provisioning of a provisioned wireless service, the method comprising:
receiving a host pass code from a subscriber, wherein the host pass code comprises an authentication credential;
activating the USW access point based on the host pass code received from the subscriber, the USW access point configured to provide a provisioned service channel identifiable by a voice-service provisioned service set identifier (vSSID) and a non-provisioned service channel identifiable by a data-service provisioned service set identifier (dSSID);
receiving an identifying credential from the dual mode mobile station by the USW access point, wherein the identifying credential comprises a guest pass code that is entered by a guest in the dual mode mobile station;
evaluating the identifying credential received from the guest via the dual mode mobile station by the USW access point relative to the authentication credential stored in the USW access point;
comparing the identifying credential with the stored authentication credential;
determining a provisioned wireless service (PWS) authentication state of the dual mode mobile station corresponding to the identifying credential received from the guest;
selectively granting the guest access to the USW access point including the provisioned service channel and the non-provisioned service channel via the dual mode mobile station based on the authentication state, if the guest pass code matches the host pass code; and denying the guest access to the USW access point via the dual mode mobile station based on the authentication state, if the guest pass code does not match the host pass code.

10. The method of claim 9, further comprising:
if the PWS authentication state is authenticated, then receiving a request for a provisioned service token from the dual mode mobile station;
evaluating an eligibility state of the dual mode mobile station for being provisioned a provisioned service token; and
if the eligibility state is eligible, then provisioning the provisioned service token to the dual mode mobile station by the USW access point.

11. The method of claim 9, wherein evaluating the identifying credential further comprises:
evaluating the identifying credential from the dual mode mobile station by the USW access point relative to a provisioning management configuration received from a managed CPE interface disposed in the USW access point.

12. The method of claim 9, wherein receiving the identifying credential from the dual mode mobile station comprises receiving the identifying credential from the guest via the dual mode mobile station within a predefined authentication period.

13. The method of claim 10, wherein the identifying credential comprises the guest pass code entered by the guest to the dual mode mobile station, and wherein the identifying credential includes a provisioned service basic service set identifier (gvBSSID) configurably unique to the dual mode mobile station.

14. A method for authenticating to a USW access point a dual mode mobile station seeking provisioning of a provisioned wireless service, the method comprising:
receiving a host pass code from a subscriber via a subscriber interface of the USW access point;
activating the USW access point based on the host pass code received from the subscriber, the USW access point configured to provide a provisioned service channel identifiable by a voice-service provisioned service set identifier (vSSID) and a non-provisioned service channel identifiable by a data-service provisioned service set identifier (dSSID);
receiving a guest pass code from a guest via the dual mode mobile station by the USW access point;
receiving a guest voice-service provisioned service basic service set identifier (gvBSSID) from the dual mode mobile station, wherein the gvBSSID is configurably unique to the dual mode mobile station; and
transmitting the guest pass code and the gvBSSID received by the USW access point to a provisioned services provider, wherein the provisioned services provider determines a PWS authentication state of the dual mode mobile station responsive to the guest pass code and the gvBSSID, and wherein upon authentication the provisioned services provider provisions a PWS token to the dual mode mobile station to thereby allow the guest selective access to at least the provisioned service channel.

15. The method of claim 14, wherein receiving a guest pass code further comprises receiving the guest pass code within a predefined authentication period from the dual mode mobile station.

16. The method of claim 15, wherein subsequent to transmitting to the provisioned services provider, the method further comprises:

receiving the PWS token from the provisioned services provider by the USW access point; and
supplying the PWS token to the dual mode mobile station by the USW access point.

17. An authentication apparatus, comprising:
means for communicating with a subscriber to receive a host pass code from the subscriber operating the authentication apparatus;
means for activating the authentication apparatus based on authenticating the host pass code received from the subscriber;
means for providing a provisioned service channel identifiable by a voice-service provisioned service set identifier (vSSID);
means for providing a non-provisioned service channel identifiable by a data-service provisioned service set identifier (dSSID);
means for communicating with a guest to receive an identifying credential from the guest via a wireless dual mode supplicant device, after activation of the authentication apparatus;
means for storing an authentication credential related to the host pass code; and
means for evaluating the identifying credential received from the guest, wherein the identifying credential is compared with the authentication credential, and an authentication state is determined in response thereto; and
means for selectively granting the guest access to or denying the guest access to a wireless network including the provisioned service channel and the non-provisioned service channel based on the authentication state.

18. The authentication apparatus of claim 17, further comprising:
means for activating the means for receiving during a predefined authentication period;
means for receiving a guest voice-service provisioned service basic service set identifier (gvBSSID) configurably unique to the wireless supplicant device during the predefined authentication period; and
means for provisioning a PWS token to the wireless supplicant device if the authentication state is authenticated,
wherein the means for evaluating the identifying credential further comprises means for evaluating the gvBSSID and the identifying credential relative to the authentication credential in response to which an authentication state is determined.

19. The authentication apparatus of claim 17, further comprising:
means for remote CPE management of the authentication device coupled to the means for evaluating the identifying credential and modifying the authentication state responsive to a remote CPE configuration.

20. The authentication apparatus of claim 18, further comprising:
means for remote CPE management of the authentication device coupled to the means for evaluating the identifying credential and means for evaluating the gvBSSID;
and modifying the authentication state responsive to a remote CPE configuration.

21. The authentication apparatus of claim 17, further comprising:
means for activating the means for receiving during a predefined authentication period;
means for receiving a guest voice-service provisioned service basic service set identifier (gvBSSID) configurably unique to the wireless supplicant device during the predefined authentication period; and means for provisioning a PWS token to the wireless supplicant device if the authentication state is authenticated, wherein the means for evaluating the identifying credential further comprises means for evaluating the gvBSSID and the identifying credential relative to the authentication credential in response to which an authentication state is determined.

22. An authentication apparatus, comprising:

means for communicating with a subscriber to receive a host pass code from the subscriber authorized to operate the authentication apparatus;

means for activating the authentication apparatus for receiving during a predefined authentication period, wherein activating the authentication apparatus is based on the pass code received from the subscriber;

means for providing a provisioned service channel identifiable by a voice-service provisioned service set identifier (vSSID);

means for providing a non-provisioned service channel identifiable by a data-service provisioned service set identifier (dSSID);

means for receiving an identifying credential from a guest via a wireless supplicant device during the predefined authentication period, wherein the identifying credential is a guest pass code entered by the guest to the wireless supplicant device;

first means for storing a first authentication credential corresponding to the identifying credential;

first means for evaluating the identifying credential relative to the first authentication credential, wherein the first means for evaluating is coupled to the first means for storing;

means for receiving a guest voice-service provisioned service basic service set identifier (gvBSSID) configurably unique to the wireless supplicant device during the predefined authentication period;

second means for storing a second authentication credential corresponding to the gvBSSID;

second means for evaluating the gvBSSID relative to the second authentication credential, wherein the second means for evaluating is coupled to the second means for storing;

means for remote CPE management of the authentication device coupled to the first means for evaluating the identifying credential and the second means for evaluating the gvBSSID, and for receiving a remote CPE configuration from a provisioned service provider;

means for determining a PWS authentication state responsive to evaluating the identifying credential relative to the first authentication credential and for evaluating the gvBSSID relative to the second authentication credential, wherein the PWS authentication state is modified responsive to a remote CPE configuration; and means for provisioning a PWS token to the wireless supplicant device if the PWS authentication state is authenticated to thereby allow the guest selective access to at least the provisioned service channel.

\* \* \* \* \*